(12) United States Patent
Ungar et al.

(10) Patent No.: US 10,215,264 B2
(45) Date of Patent: Feb. 26, 2019

(54) LINEAR ACTUATOR SYSTEM WITH CIRCUMFERENTIALLY AND AXIALLY ADJUSTABLE END STOP ASSEMBLY

(71) Applicant: The Boeing Company, Chicago, IL (US)

(72) Inventors: Lior Ungar, Lynnwood, WA (US); Jeffrey V. Lindstrom, Seattle, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 14/992,146

(22) Filed: Jan. 11, 2016

(65) Prior Publication Data

US 2017/0198790 A1    Jul. 13, 2017

(51) Int. Cl.
| | |
|---|---|
| *B64C 9/22* | (2006.01) |
| *F16H 25/20* | (2006.01) |
| *F16H 25/22* | (2006.01) |
| *F16D 1/08* | (2006.01) |
| *B64C 13/40* | (2006.01) |
| *B64C 13/50* | (2006.01) |

(52) U.S. Cl.
CPC ........... *F16H 25/2015* (2013.01); *B64C 9/22* (2013.01); *B64C 13/40* (2013.01); *B64C 13/50* (2013.01); *F16D 1/0864* (2013.01); *F16H 25/20* (2013.01); *F16H 25/2204* (2013.01); *F16H 2025/204* (2013.01)

(58) Field of Classification Search
CPC ... F16H 25/2015; F16H 25/20; F16H 25/2204
See application file for complete search history.

(56) References Cited

U.S. PATENT DOCUMENTS

| | | | | |
|---|---|---|---|---|
| 2,590,251 A | * | 3/1952 | Hoover | F16H 25/2015 74/89.37 |
| 3,200,664 A | * | 8/1965 | Mauric | F16H 25/2015 74/89.37 |
| 3,277,736 A | * | 10/1966 | Goodman | F16H 25/2015 192/141 |
| 3,319,481 A | * | 5/1967 | Goodman | F16H 25/2015 192/141 |
| 3,334,526 A | * | 8/1967 | Flarsheim | F16H 25/2015 74/89.37 |

(Continued)

FOREIGN PATENT DOCUMENTS

| | | |
|---|---|---|
| CN | 102 889 352 | 6/2015 |
| EP | 2 886 908 | 6/2015 |

OTHER PUBLICATIONS

European Patent Office, Extended European Search Report, EP 17 15 0617 (dated Jul. 19, 2017).

*Primary Examiner* — William Kelleher
*Assistant Examiner* — Gregory T Prather
(74) *Attorney, Agent, or Firm* — Walters & Wasylyna LLC (57) ABSTRACT

A linear actuator system including a screw member elongated along a longitudinal axis, the screw member including a threaded portion and an end portion, a nut member coaxially received over the screw member and in threaded engagement with the threaded portion of the screw member, a ring member received over the end portion of the screw member, a flange member connected to the end portion of the screw member, and a threaded member in threaded engagement with the flange member, the threaded member having a distal end protruding toward the ring member.

20 Claims, 8 Drawing Sheets

(56) References Cited

U.S. PATENT DOCUMENTS

| | | | | |
|---|---|---|---|---|
| 3,369,087 A * | 2/1968 | Eller | ..................... | B23Q 11/04 200/47 |
| 3,508,449 A * | 4/1970 | Kraina | ................ | F16H 25/2015 74/89.37 |
| 3,546,930 A * | 12/1970 | Flarsheim | ........... | F16H 25/2015 74/424.9 |
| 3,651,711 A * | 3/1972 | Greenwood | ............ | F16H 25/20 251/164 |
| 3,728,903 A * | 4/1973 | Haller | .................... | B23Q 5/404 74/89.36 |
| 3,743,909 A * | 7/1973 | Ritchie | .............. | F16H 25/2015 227/130 |
| 4,295,384 A * | 10/1981 | Brandt | ............... | F16H 25/2015 411/259 |
| 4,373,404 A * | 2/1983 | Heinz | .................... | F16H 25/20 74/89.25 |
| 4,712,441 A * | 12/1987 | Abraham | ........... | F16H 25/2015 74/412 TA |
| 4,889,002 A * | 12/1989 | Abraham | ........... | F16H 25/2015 310/78 |
| 5,088,339 A * | 2/1992 | Lochmoeller | ....... | F16H 25/2015 192/141 |
| 5,174,167 A * | 12/1992 | Hill | ...................... | B60N 2/0232 297/330 |
| 5,461,935 A * | 10/1995 | Hill | ..................... | F16H 25/2015 192/141 |
| 5,673,593 A * | 10/1997 | Lafferty | .............. | F16H 25/2015 192/141 |
| 6,051,950 A * | 4/2000 | Ishii | .................... | F16H 25/2015 318/11 |
| 6,293,723 B1 * | 9/2001 | Kiefer | .................. | B60N 2/0224 403/21 |
| 6,464,421 B1 * | 10/2002 | Kiefer | .................. | B60N 2/0224 403/21 |
| 7,562,594 B2 * | 7/2009 | Nagai | ................. | F16H 25/2015 188/129 |
| 7,866,864 B2 * | 1/2011 | Hsu | ..................... | F16H 25/2015 310/49.01 |
| 8,109,164 B2 * | 2/2012 | Tseng | ................. | F16H 25/2015 74/89.37 |
| 8,650,977 B2 * | 2/2014 | Takahashi | .......... | F16H 25/2015 324/207.25 |
| 8,794,087 B2 * | 8/2014 | Wu | ..................... | F16H 25/2015 74/424.71 |
| 9,670,999 B2 * | 6/2017 | Gitnes | ................ | F16H 25/2015 |
| 9,683,643 B2 * | 6/2017 | Cyren | ................ | F16H 25/2015 |

\* cited by examiner

LINEAR ACTUATOR SYSTEM WITH CIRCUMFERENTIALLY AND AXIALLY ADJUSTABLE END STOP ASSEMBLY

FIELD

This application relates to linear actuators, particularly screw-type mechanical linear actuators (e.g., ball screws, acme screws and roller screws), and, more particularly, to end stops for screw-type mechanical linear actuators.

BACKGROUND

Mechanical linear actuators covert rotational motion into linear motion. One of the most common mechanical linear actuators is the screw-type mechanical linear actuator. In its most basic form, a screw-type mechanical linear actuator includes a nut member engaged with a screw member. Ball screws, acme screws and roller screws—common screw-type mechanical linear actuators—introduce ball bearings or rollers (e.g., moving through a ball race) to reduce friction between the nut member and the screw member or just plain unique thread in the case of acme screws. Regardless of the level of complexity of the screw-type mechanical linear actuator, rotation of the screw member about its longitudinal axis causes corresponding movement of the nut member along the longitudinal axis. Movement of the nut member along the longitudinal axis of the screw member may be in either a positive direction or a negative direction, depending on the direction of rotation of the screw member about the longitudinal axis.

In certain applications, it is necessary to physically limit the travel of the nut member of a screw-type mechanical linear actuator relative to the screw member. For example, an end stop may be positioned at the end of the screw member. When the nut member comes into physical contact with the end stop, the end stop may inhibit further axial movement of the nut member beyond the end stop.

In some cases, there is a need to have a separate mechanical end stop mechanism. Thrust reversers are one example, wherein the linear movement is by hydraulic pistons, but there is a need to have a separate mechanical end stop mechanism to stop the pistons before they reach their end of motion and can be damaged. Power drive units are another example, wherein the linear motion is only for the sake of stopping the surfaces in case of a system failure in order to prevent the surfaces from hitting the structure members.

Despite advances already made in the field, those skilled in the art continue with research and development efforts directed to multiple axis end stops for mechanical linear actuators.

SUMMARY

In one embodiment, the disclosed linear actuator system may include a screw member elongated along a longitudinal axis, the screw member including a threaded portion and an end portion, a nut member coaxially received over the screw member and in threaded engagement with the threaded portion of the screw member, a ring member received over the end portion of the screw member, a flange member connected to the end portion of the screw member, and a threaded member in threaded engagement with the flange member, the threaded member having a distal end protruding toward the ring member.

In another embodiment, the disclosed linear actuator system may include a screw member elongated along a longitudinal axis and including an end portion, wherein the end portion includes a plurality of splines and defines a threaded bore, a nut member coaxially received over the screw member, the nut member including a first tooth member, a ring member in meshed engagement with the plurality of splines, the ring member including a second tooth member, a flange member including a flange portion and a threaded shaft extending from the flange portion, wherein the threaded shaft is in threaded engagement with the threaded bore, and a plurality of threaded members in threaded engagement with the flange portion of the flange member, each threaded member including a distal end protruding into abutting engagement with the ring member.

Also disclosed is a method for end stopping a linear actuator assembly that includes a nut member in threaded engagement with a screw member, wherein the screw member includes a threaded portion and an end portion. The method may include the steps of (1) positioning a ring member over the end portion of the screw member; (2) connecting a flange member to the end portion of the screw member; and (3) threading a threaded member through the flange member until a distal end of the threaded member comes into abutting engagement with the ring member.

Other embodiments of the disclosed linear actuator system with circumferentially and axially adjustable end stop assembly will become apparent from the following detailed description, the accompanying drawings and the appended claims.

DETAILED DESCRIPTION

Figure 1:
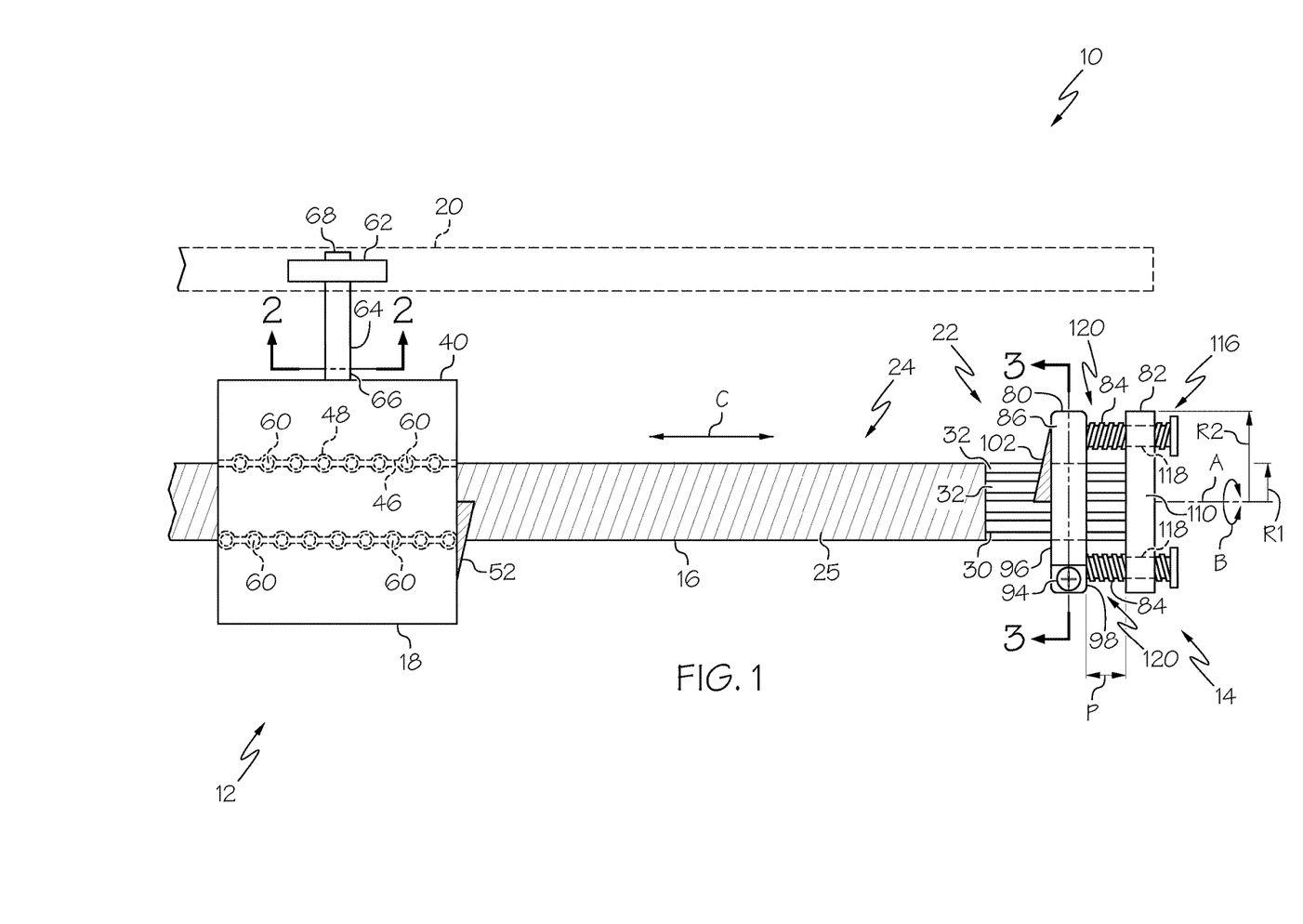
FIG. 1 is a side elevational view of one embodiment of the disclosed linear actuator system with circumferentially and axially adjustable end stop assembly.

Referring to FIG. 1, one embodiment of the disclosed linear actuator system, generally designated 10, may include a linear actuator assembly 12 and an end stop assembly 14. As is described in greater detail herein, the end stop assembly 14 may be connected to the linear actuator assembly 12, and may be both circumferentially and axially adjustable with respect to the linear actuator assembly 12.

The linear actuator assembly 12 of the disclosed linear actuator system 10 may include a screw member 16, a nut member 18 and a guiding track 20. The screw member 16 may be rotatable (see arrow B) about a longitudinal axis A. The nut member 18 may be in threaded engagement with the screw member 16, but may also be operatively engaged with the guiding track 20 such that the nut member 18 may not rotate with the screw member 16 about the longitudinal axis A. As such, the nut member 18 may travel axially along (see arrow C) the screw member 16 in response to rotation of the screw member 16 about the longitudinal axis A.

Thus, the linear actuator assembly 12 of the disclosed linear actuator system 10 may convert rotational motion (see arrow B) of the screw member 16 about the longitudinal axis A into axial motion (see arrow C) of the nut member 18 along the longitudinal axis A. While a particular screw-type linear actuator assembly 12 is shown and described, the disclosed linear actuator system 10 may include various linear actuator assemblies capable of converting rotational motion of a screw member into axial motion of a nut member without departing from the scope of the present disclosure.

Still referring to FIG. 1, the screw member 16 of the linear actuator assembly 12 of the disclosed linear actuator system 10 may be elongated along the longitudinal axis A, and may include a first end portion 22, a second end portion (not shown) longitudinally opposed from the first end portion 22, and a threaded portion 24 (comprising threads 25) extending from proximate (at or near) the first end portion 22 to proximate the second end portion. The nut member 18 of the linear actuator assembly 12 may travel along the threaded portion 24 of the screw member 16. The end stop assembly 14 may be connected to the first end portion 22 of the screw member 16.

Figure 3:
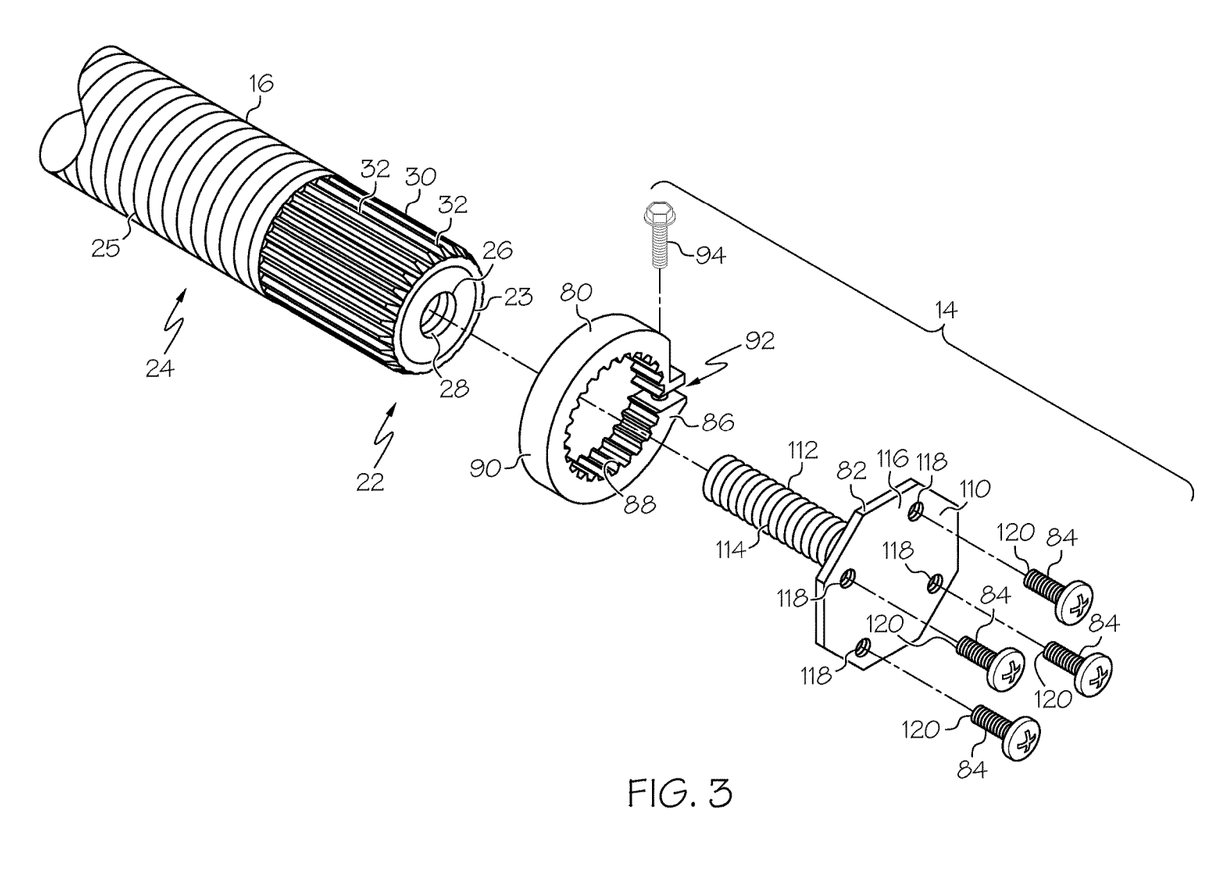
FIG. 3 is an exploded perspective view of the end stop assembly of the linear actuator system of FIG. 1.
Figure 4:
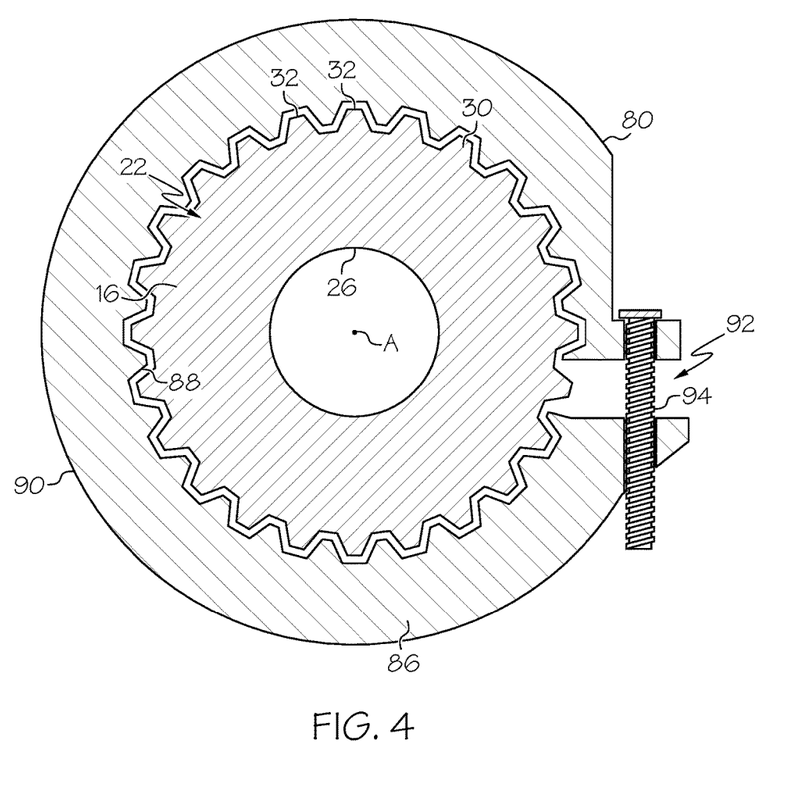
FIG. 4 is an axial view, in cross-section, of a portion of the end stop assembly of the linear actuator system of FIG. 1.

As best shown in FIGS. 3 and 4, the first end portion 22 of the screw member 16 may define a bore 26. The bore 26 may open at the end 23 (FIG. 3) of the first end portion 22 of the screw member 16, and may axially extend into the screw member 16 along the longitudinal axis A. The bore 26 may be threaded (see threads 28 in FIG. 3).

As best shown in FIGS. 1, 3 and 4, the first end portion 22 of the screw member 16 may include a torque transfer feature 30. In the illustrated embodiment, the torque transfer feature 30 may include a plurality of longitudinally extending splines 32 circumferentially arranged about the first end portion 22 of the screw member 16. In one alternative embodiment, the torque transfer feature 30 of the first end portion 22 of the screw member 16 may be a polygonal (e.g., hex or double hex) profile in axial view.

The second end portion of the screw member 16, while not shown in the drawings, may optionally be configured in the same (or similar) manner as the first end portion 22. Therefore, a second end stop assembly (not shown) may optionally be connected to the second end portion of the screw member 16.

Figure 5:
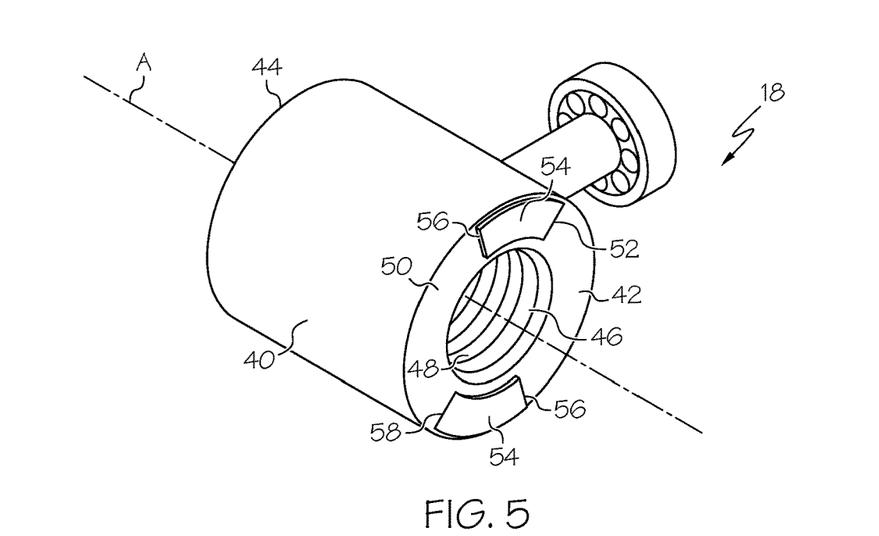
FIG. 5 is a perspective view of the nut member of the linear actuator system of FIG. 1.

Referring to FIG. 5, the nut member 18 of the linear actuator assembly 12 (FIG. 1) of the disclosed linear actuator system 10 (FIG. 1) may include a body 40 having a first end 42 longitudinally opposed (vis-a-vis longitudinal axis A) from a second end 44. The body 40 of the nut member 18 may define a bore 46 longitudinally extending from the first end 42 to the second end 44. The bore 46 may be threaded (see threads 48), and the threads 48 of the bore 46 of the nut member 18 may correspond to the threads 25 of the threaded portion 24 of the screw member 16.

The first end 42 of the nut member 18 may define a first surface 50, and a plane coincident with the first surface 50 may be perpendicular to the longitudinal axis A. A first tooth member 52 may be positioned on (e.g., connected to or integral with) the first surface 50 of the nut member 18. A second tooth member 58 having the same or similar structure as the first tooth member 52 may be positioned on the first surface 50 of the nut member 18, and may be circumferentially spaced a distance (e.g., 180 degrees) from the first tooth member 52. Those skilled in the art will appreciate that various alternative tooth member configurations may be used without departing from the scope of the present disclosure.

The tooth members 52, 58 may facilitate circumferential engagement with the end stop assembly 14, as is described in greater detail herein. The tooth members 52, 58 may have various structures capable of effecting the desired circumferential engagement with the end stop assembly 14 without departing from the scope of the present disclosure. In one particular construction, each tooth member 52, 58 may include a circumferentially extending ramped portion 54 terminating at a face portion 56. Therefore, the face portion 56 of each tooth member 52, 58 may be positioned to circumferentially engage the end stop assembly 14.

At this point, those skilled in the art will appreciate that the second end 44 of the nut member 18 may also include tooth members (not shown) when the second end portion (not shown) of the screw member 16 (FIG. 1) includes a second end stop assembly (not shown).

Referring back to FIG. 1, the nut member 18 may be coaxially received over the screw member 16 such that the screw member 16 extends through the bore 46 of the nut member 18 and the threads 48 of the nut member 18 are engaged with the threads 25 of the screw member 16. The threads 48 of the nut member 18 may be directly engaged with the threads 25 of the screw member 16. Alternatively, as shown in FIG. 1, ball bearings 60 may be positioned between the threads 48 of the nut member 18 and the threads 25 of the screw member 16, thereby reducing friction between the nut member 18 and the screw member 16.

Figure 2:
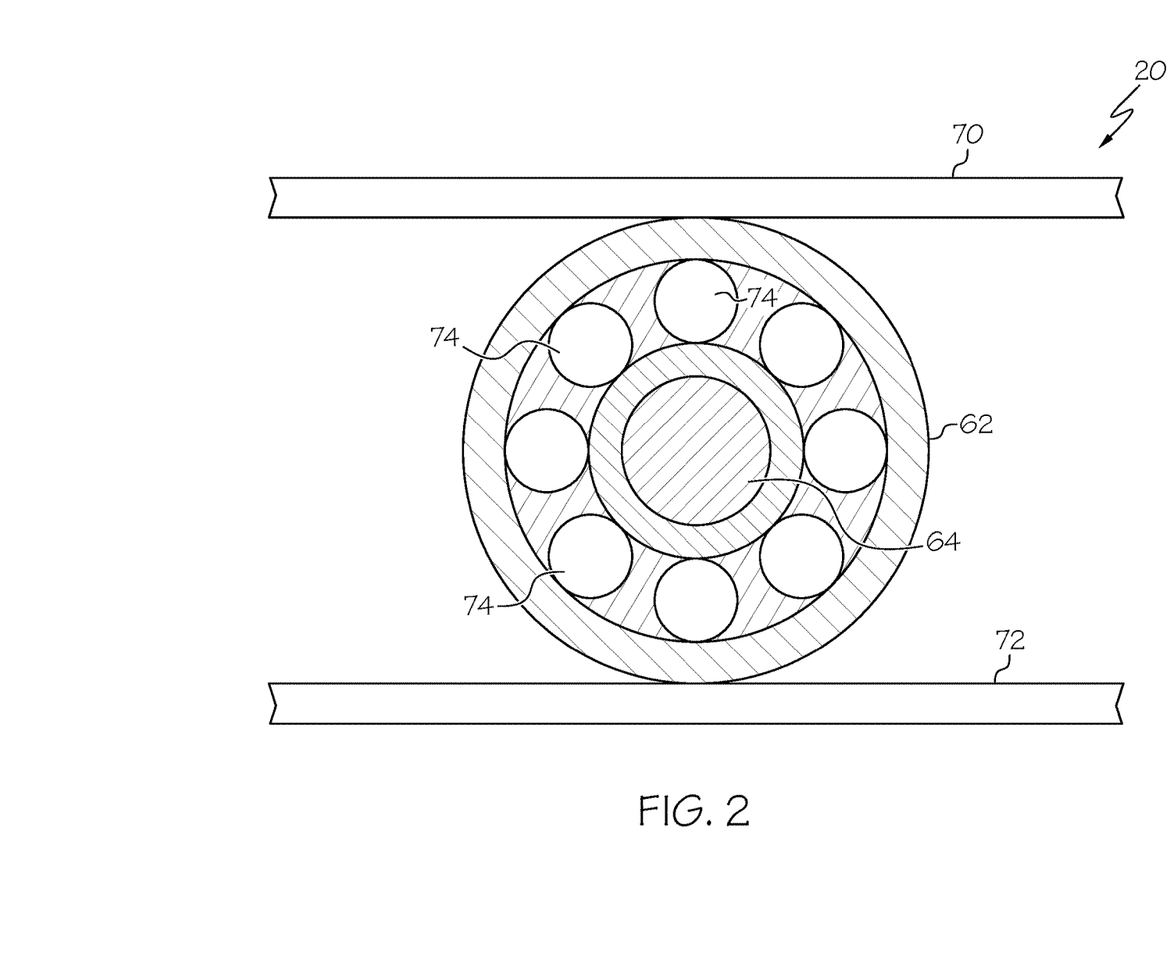
FIG. 2 is a plan view of a portion of the linear actuator system of FIG. 1 showing the track system.

Referring to FIGS. 1 and 2, a roller 62 may be connected to the body 40 (FIG. 1) of the nut member 18 (FIG. 1) by way of a shaft 64. Specifically, the shaft 64 may include a first end portion 66 connected to the body 40 of the nut member 18 and a second end portion 68 opposed from the first end portion 66. The roller 62 may be rotatably connected to the second end portion 68 of the shaft 64, and may be engaged with the guiding track 20 (e.g., with guide members 70, 72 of the guiding track 20). Bearings 74 (e.g., ball bearings) within the roller 62 may reduce friction as the roller 62 (and associated nut member 18) moves along the guiding track 20.

Thus, with the nut member 18 engaged with the guiding track 20 (e.g., by way of the shaft 64 and the roller 62), the nut member 18 may not rotate with the screw member 16 about the longitudinal axis A—the nut member 18 may be circumferentially constrained by the guiding track 20. Therefore, the nut member 18 may axially move along the longitudinal axis A in response to rotation of the screw member 16 about the longitudinal axis A.

Referring now to FIGS. 1 and 3, the end stop assembly 14 of the disclosed linear actuator system 10 may include a ring member 80, a flange member 82 and one or more threaded members 84 (four threaded members 84 are shown in FIG. 3), which may be externally threaded, such as bolts, screws (e.g., machine screws) or the like. The ring member 80 may be received over the first end portion 22 of the screw member 16 and the flange member 82 may be connected to the end 23 of the first end portion 22 of the screw member 16. The threaded members 84 may be in threaded engagement with the flange member 82, and the threaded members 84 may extend from the flange member 82 into abutting engagement with the ring member 80.

Figure 6:
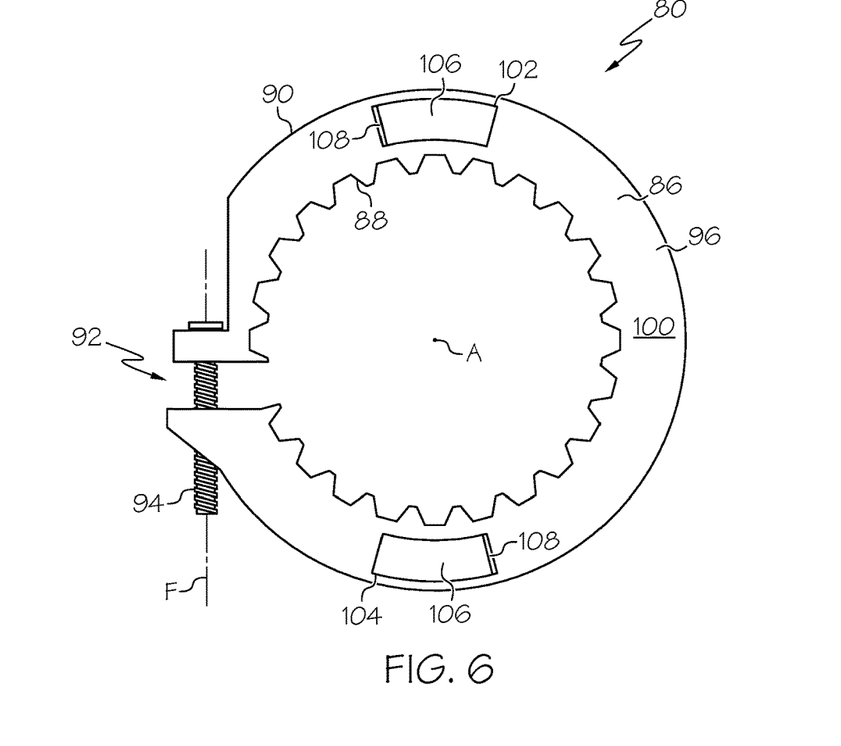
FIG. 6 is an axial elevational view of the spline ring of the linear actuator system of FIG. 1.

As best shown in FIGS. 4 and 6, the ring member 80 of the end stop assembly 14 (FIGS. 1 and 3) may include a circumferentially extending body portion 86 that defines a radially (vis-à-vis longitudinal axis A) inner surface 88 and a radially outer surface 90. The inner surface 88 of the ring member 80 may engage the torque transfer feature 30 of the first end portion 22 of the screw member 16. As one example, when the torque transfer feature 30 of the first end portion 22 of the screw member 16 includes a plurality of longitudinally extending splines 32 circumferentially arranged about the first end portion 22 of the screw member 16, as shown in FIG. 4, then the inner surface 88 of the ring member 80 may be contoured to mesh with the splines 32. As another example, when the torque transfer feature 30 of the first end portion 22 of the screw member 16 includes a polygonal (e.g., hex or double hex) profile in axial view, then the inner surface 88 of the ring member 80 may include a corresponding polygonal (e.g., hex or double hex) profile in axial view.

In one particular aspect, the ring member 80 of the end stop assembly 14 (FIGS. 1 and 3) may be a clamping ring, wherein the circumferentially extending body portion 86 is not continuous, but rather defines a gap 92. A threaded fastener 94 may bridge the gap 92 such that rotation of the threaded fastener 94 about a fastener axis F may either open or close the gap 92, thereby loosening or tightening the ring member 80. Those skilled in the art will appreciate that the ability to loosen and tighten the ring member 80 by way of the threaded fastener 94 may facilitate positioning the ring member 80 over the first end portion 22 of the screw member 16 at the desired axial position and the desired circumferential orientation relative to the screw member 16.

In an alternative aspect (not shown), the ring member 80 of the end stop assembly 14 may be a continuous ring (no gap 92). Therefore, a set screw or the like may be required to secure the ring member 80 at a particular axial position relative to the screw member 16. Furthermore, with a ring member 80 having a continuous body portion 86, circumferential adjustments of the ring member 80 relative to the screw member 16 may require completely decoupling/separating the ring member 80 from the screw member 16 to make such an adjustment.

As best shown in FIG. 1, the body portion 86 of the ring member 80 of the end stop assembly 14 may include an inside end 96 longitudinally opposed (vis--à-vis longitudinal axis A) from an outside end 98. As best shown in FIG. 6, the inside end 96 of the body portion 86 of the ring member 80 may define an inside surface 100, and a plane coincident with the inside surface 100 may be perpendicular to the longitudinal axis A.

Still referring to FIG. 6, a first tooth member 102 may be positioned on (e.g., connected to or integral with) the inside surface 100 of the ring member 80. A second tooth member 104 having the same or similar structure as the first tooth member 102 may be positioned on the inside surface 100 of the ring member 80, and may be circumferentially spaced a distance (e.g., 180 degrees) from the first tooth member 102. Those skilled in the art will appreciate that fewer than two tooth members (e.g., only one or none) or more than two tooth members (e.g., three or more) may be used without departing from the scope of the present disclosure.

The tooth members 102, 104 of the ring member 80 may facilitate circumferential engagement with corresponding tooth members 52, 54 of the nut member 18. The tooth members 102, 104 of the ring member 80 may be structured to correspond with the structures of the tooth members 52, 54 of the nut member 18, thereby facilitating a circumferential tooth member 52, 54-to-tooth member 102, 104 engagement when the nut member 18 axially approximates the ring member 80.

In one particular construction, each tooth member 102, 104 of the ring member 80 may include a circumferentially extending ramped portion 106 terminating at a face portion 108. Therefore, the face portions 108 of the tooth members 102, 104 of the ring member 80 may circumferentially engage the face portions 56 of the tooth members 52, 54 of the nut member 18 when the nut member 18 axially approximates the ring member 80.

Thus, both the axial position and the circumferential orientation of the ring member 80 of the end stop assembly 14 may dictate the axial location at which the end stop assembly 14 will stop the nut member 18 of the linear actuator assembly 12. The axial position of the ring member 80 may be adjusted by loosening the threaded fastener 94 (if present) and moving the ring member 80 relative to the first end portion 22 of the screw member 16 along the longitudinal axis A of the screw member 16 until the desired axial position has been achieved, at which time the threaded fastener 94 may be tightened. The circumferential orientation of the ring member 80 may be adjusted by loosening the threaded fastener 94 (or removing the ring member 80 from the first end portion 22 of the screw member 16) and rotating the ring member 80 relative to the first end portion 22 of the screw member 16 about the longitudinal axis A of the screw member 16 until the desired circumferential orientation has been achieved, at which time the threaded fastener 94 may be tightened (or the ring member 80 reengaged with the first end portion 22 of the screw member 16).

Referring back to FIG. 1, the flange member 82 and the threaded members 84 of the end stop assembly 14 of the disclosed linear actuator system 10 may reinforce the axial position of the ring member 80 of the end stop assembly 14. Specifically, the flange member 82 may be connected to the end 23 of the first end portion 22 of the screw member 16 and the threaded members 84 may be in threaded engagement with the flange member 82 such that the threaded members 84 may extend from the flange member 82 into abutting engagement with the ring member 80, thereby inhibiting axial movement (e.g., unintentional sliding) of the ring member 80 toward the flange member 82, such as when the nut member 18 of the linear actuator assembly 12 is engaged with the ring member 80 of the end stop assembly 14.

Referring to FIG. 3, the flange member 82 of the end stop assembly 14 may include a flange portion 110 and a shaft 112 axially extending from the flange portion 110. The shaft 112 may include threads 114. Therefore, the flange member 82 may be connected (e.g., a threaded connection) to the end 23 of the first end portion 22 of the screw member 16 by screwing the threaded shaft 112 of the flange member 82 into the threaded bore 26 in the first end portion 22 of the screw member 16. As such, the threaded shaft 112 of the flange member 82 may facilitate connection of the flange member 82 to the first end portion 22 of the screw member 16 and may axially align the flange member 82 with the longitudinal axis A of the screw member 16.

As best shown in FIG. 1, the flange portion 110 of the flange member 82 may radially protrude outward beyond the screw member 16, thereby defining a protruding portion 116 of the flange portion 110 of the flange member 82. For example, the screw member 16 may have a screw radius $R_1$ and the flange portion 110 of the flange member 82 may have an effective radius $R_2$, wherein the effective radius $R_2$ is greater than the screw radius $R_1$, and wherein the protruding portion 116 of the flange portion 110 is the portion of the flange portion 110 protruding beyond the screw radius $R_1$. Because the flange portion 110 may not be round in axial view (e.g., it may be squared off to facilitate screwing the threaded shaft 112 of the flange member 82 into the threaded bore 26 of the screw member 16), the "effective" radius $R_2$ refers to the maximum radially protruding distance of the flange portion 110 of the flange member 82.

Referring back to FIG. 3, the flange portion 110 of the flange member 82 may define threaded bores 118 axially extending therethrough. The threaded bores 118 may be located within the protruding portion 116 of flange portion 110 of the flange member 82. The threaded bores 118 may be sized and threaded to receive the threaded members 84.

As shown in FIG. 1, with the ring member 80 positioned on the first end portion 22 of the screw member 16 and the flange member 82 connected to the end 23 (FIG. 3) of the first end portion 22 of the screw member 16, each threaded member 84 may be threaded through an associated bore 118 in the flange portion 110 of the flange member 82 such that the distal ends 120 of the threaded members 84 are in abutting engagement with the outside end 98 of the ring member 80. As such, the threaded members 84 may inhibit axial movement of the ring member 80 toward the flange member 82, thereby maintaining the ring member 80 at the desired axial position.

In the event that an axial adjustment of the ring member 80 is desired, the protruding depth P of the threaded members 84 may be increased/decreased, as necessary, by appropriately screwing/unscrewing the threaded members 84 relative to the associated bores 118 in the flange portion 110 of the flange member 82. Selecting threaded members 84 having a fine thread lead (and providing appropriately threaded bores 118) may facilitate making very precise axial position adjustments.

Accordingly, the end stop assembly 14 of the disclosed linear actuator system 10 may allow a user to adjust and reinforce the axial position of the ring member 80 of the end stop assembly 14 relative to the screw member 16 of the linear actuator assembly 12, while also allowing a user to adjust the circumferential orientation of the ring member 80 of the end stop assembly 14 relative to the screw member 16.

The disclosed linear actuator system 10 may find applications in various industries, such as the aerospace industry, the automotive industry, the marine industry and the like. Many applications where over travel of a part/member is a concern may benefit from the disclosed linear actuator system 10.

Figure 7:
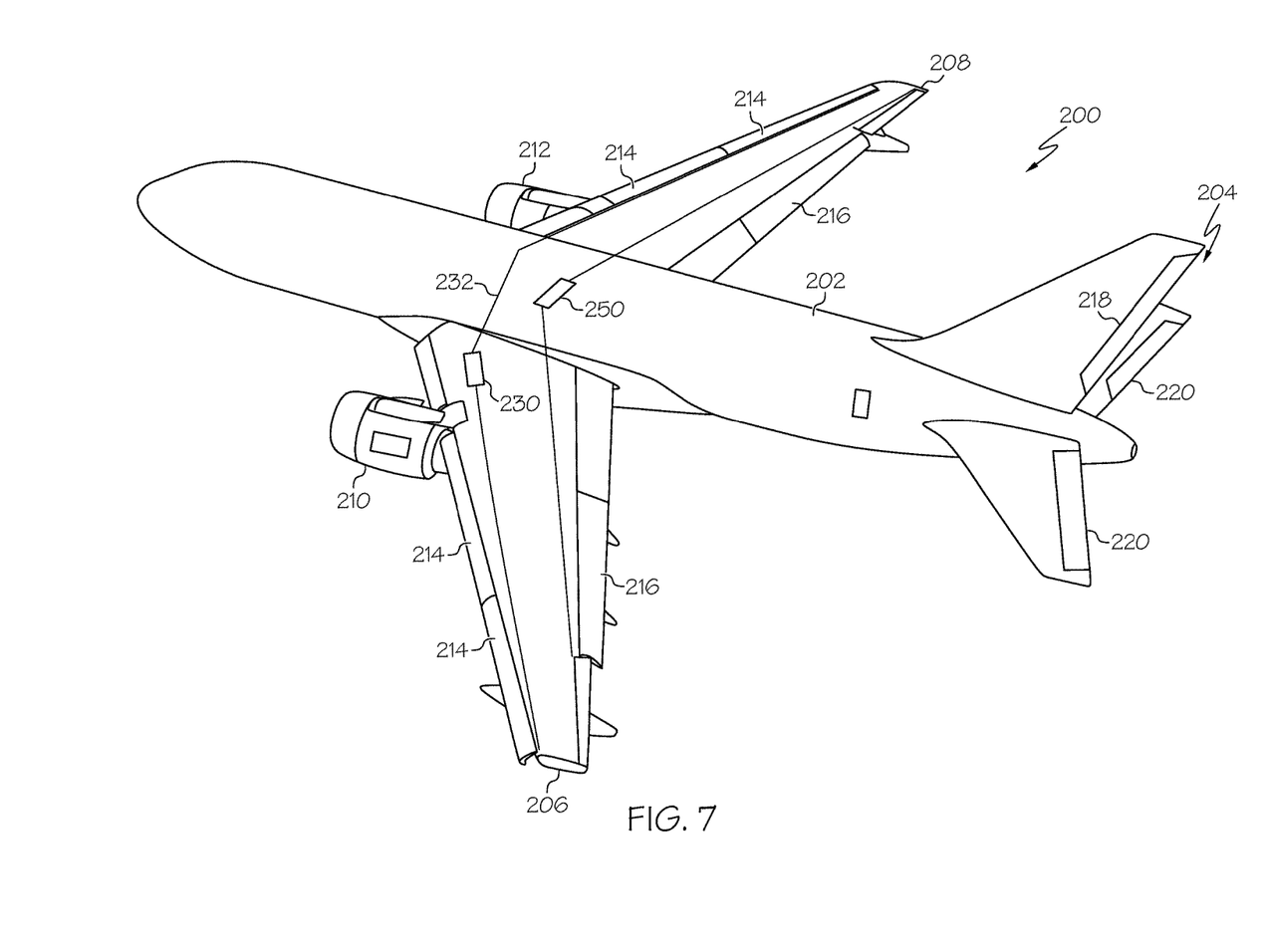
FIG. 7 is a side perspective view of an aircraft employing the disclosed linear actuator system with circumferentially and axially adjustable end stop assembly.

Referring to FIG. 7, disclosed is an aircraft, generally designated 200, incorporating the disclosed linear actuator system 10. The aircraft 200 may include a fuselage 202, an empennage 204, wings 206, 208 and propulsion systems 210, 212 (e.g., turbofan engines). Additionally, the aircraft 200 may include one or more flight control surfaces, such as slats 214 and ailerons 216 associated with the wings 206, 208, and a rudder 218 and elevators 220 associated with the empennage 204. Of course, the aircraft 200 may also include various additional components and systems without departing from the scope of the present disclosure.

Figure 8:
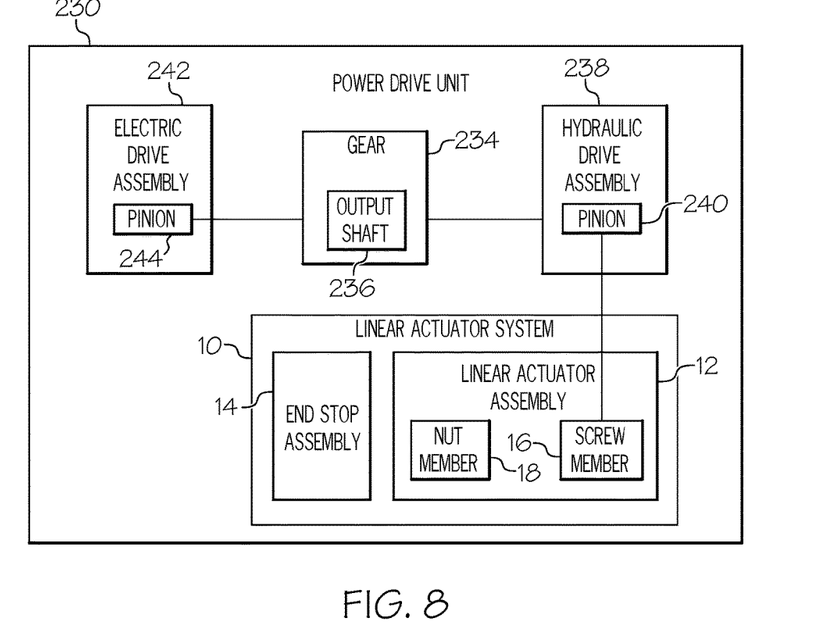
FIG. 8 is a block diagram of a power drive unit of the aircraft of FIG. 7.

The slats 214 of the aircraft 200 may be actuated by a power drive unit 230, which may be mechanically coupled with the slats 214 by way of torque tubes 232. In one particular implementation, the disclosed linear actuator system 10 may be incorporated into the power drive unit 230 to prevent over travel of the slats 214. For example, as shown in FIG. 8, the power drive unit 230 may include a gear 234 coupled with an output shaft 236, and the output shaft 236 may be coupled with the torque tubes 232 (FIG. 7). A hydraulic drive assembly 238 may be coupled with the gear 234 by way of a first pinion 240. An electric drive assembly 242 may be coupled with the gear 234 by way of a second pinion 244. Therefore, for redundancy, both the hydraulic drive assembly 238 and the electric drive assembly 242 may drive the output shaft 236. The linear actuator system 10 may be incorporated into the power drive unit 230, such as by coupling the screw member 16 of the linear actuator assembly 12 with the pinion 240 of the hydraulic drive assembly 238. Therefore, as the pinion 240 moves with the gear 234, the pinion 240 rotates the screw member 16 of the linear actuator assembly 12, thereby moving the nut member 18 along the screw member 16. The end stop assembly 14 of the disclosed linear actuator system 10 may be positioned to stop movement of the nut member 18 relative to the screw member 16, and, ultimately, stop movement of the gear 234, thereby reducing (if not eliminating) the possibility of over travel of the slats 214 (FIG. 7).

Referring back to FIG. 7, in addition to (or as an alternative to) the power drive unit 230, the disclosed linear actuator system 10 (FIG. 1) may be incorporated into other components of the aircraft 200. As one alternative example, the disclosed linear actuator system 10 may be incorporated into a second power drive unit 250 associated with the ailerons 216. As another alternative example, the disclosed linear actuator system 10 may be incorporated into thrust reverses 252 associated with the propulsion systems 210, 212 of the aircraft 200. As yet another alternative example, the disclosed linear actuator system 10 may be incorporated into an actuator 254 associated with the elevators 220 of the aircraft 200.

Figure 9:
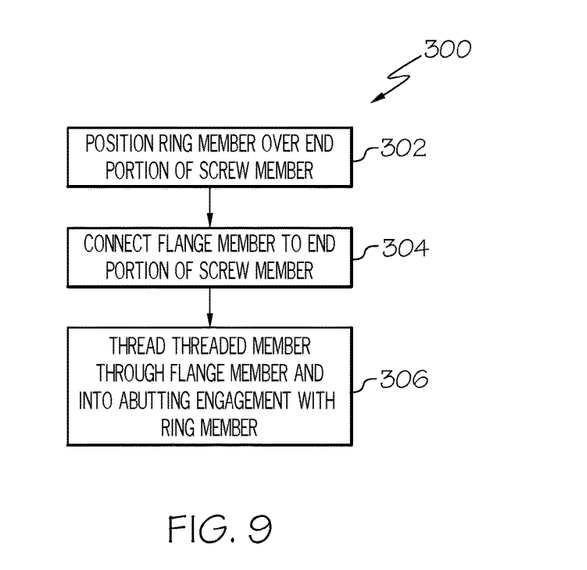
FIG. 9 is a flow diagram depicting one embodiment of the disclosed end stopping method for a linear actuator system.

Also disclosed is an end stopping method for a linear actuator assembly 12. Referring to FIG. 9, one embodiment of the disclosed end stopping method for a linear actuator assembly 12, generally designated 300, may begin at Block 302 with the step of positioning a ring member 80 over the end portion 22 of the screw member 16 of the linear actuator assembly 12 such that the ring member 80 assumes the desired axial position and circumferential orientation with respect to the screw member 16. The end portion 22 of the screw member 16 may include a torque transfer feature 30, such as splines 32 or a polygonal cross-sectional profile, and the ring member 80 may be engaged with the torque transfer feature 30 of the screw member 16.

At Block 304, a flange member 82 may be connected to the end portion 22 of the screw member 16. The flange member 82 may include a flange portion 110 and a threaded shaft 112. The flange member 82 may be connected to the end portion 22 of the screw member 16 by threading the threaded shaft 112 of the flange member 82 into a corresponding axially extending threaded bore 26 in the end portion 22 of the screw member 16.

At Block 306, one or more threaded members 84 may be threaded into engagement with the flange member 82 (e.g., the flange portion 110 of the flange member 82) until a distal end 120 of the threaded member 84 comes into abutting engagement with the ring member 80. For example, the flange portion 110 of the flange member 82 may define one or more threaded bores 118, and the threaded member 84 may be threaded through the threaded bore 118 such that the distal end 120 of the threaded member 84 extends into abutting engagement with the ring member 80.

Figure 10:
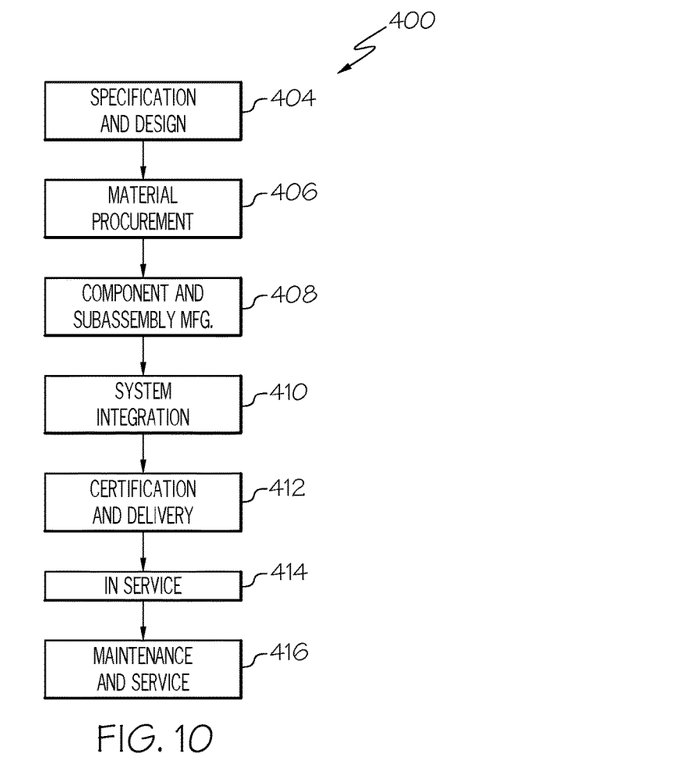
FIG. 10 is flow diagram of an aircraft manufacturing and service methodology.
Figure 11:
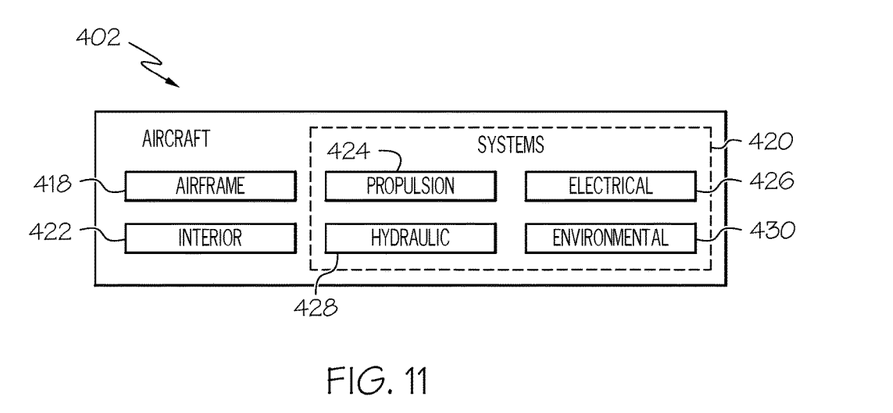
FIG. 11 is a block diagram of an aircraft.

Examples of the disclosure may be described in the context of an aircraft manufacturing and service method 400, as shown in FIG. 10, and an aircraft 402, as shown in FIG. 11. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed linear actuator system with circumferentially and axially adjustable end stop assembly may be employed during any one or more of the stages of the aircraft manufacturing and service method 400. As one example, the disclosed linear actuator system with circumferentially and axially adjustable end stop assembly may be employed during material procurement 406. As another example, components or subassemblies corresponding to component/subassembly manufacturing 408, system integration 410, and or maintenance and service 416 may be fabricated or manufactured using the disclosed linear actuator system with circumferentially and axially adjustable end stop assembly. As another example, the airframe 418 and the interior 422 may be constructed using the disclosed linear actuator system with circumferentially and axially adjustable end stop assembly. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed linear actuator system with circumferentially and axially adjustable end stop assembly are described in the context of an aircraft; however, one of ordinary skill in the art will readily recognize that the disclosed linear actuator system with circumferentially and axially adjustable end stop assembly may be utilized for a variety of applications. For example, the disclosed linear actuator system with circumferentially and axially adjustable end stop assembly may be implemented in various types of vehicle including, e.g., helicopters, passenger ships, automobiles and the like.

Although various embodiments of the disclosed linear actuator system with circumferentially and axially adjustable end stop assembly have been shown and described, modifications may occur to those skilled in the art upon reading the specification. The present application includes such modifications and is limited only by the scope of the claims.

What is claimed is:

1. A linear actuator system comprising:
   a screw member elongated along a longitudinal axis, said screw member comprising a threaded portion and an end portion;
   a nut member coaxially received over said screw member, such that said screw member extends through a bore of said nut member, and in threaded engagement with said threaded portion of said screw member;
   a ring member received over said end portion of said screw member, such that said screw member extends through a bore of said ring member;
   a flange member connected to said end portion of said screw member; and
   a threaded member in threaded engagement with said flange member, said threaded member comprising a distal end protruding toward said ring member.

2. The linear actuator system of claim 1 further comprising a guiding track, wherein said nut member is engaged with said guiding track.

3. The linear actuator system of claim 2 further comprising a roller connected to said nut member, wherein said roller is engaged with said guiding track.

4. The linear actuator system of claim 1 further comprising ball bearings positioned between said screw member and said nut member.

5. The linear actuator system of claim 1 wherein said connection between said flange member and said end portion of said screw member is a threaded connection.

6. The linear actuator system of claim 1 wherein said flange member comprises a flange portion and a threaded shaft, and wherein said threaded member in threaded engagement with said flange portion of said flange member.

7. The linear actuator system of claim 6 wherein said end portion of said screw member defines a threaded bore, and wherein said threaded shaft of said flange member is threaded into said threaded bore of said screw member.

8. The linear actuator system of claim 1 wherein said end portion of said screw member comprises a torque transfer feature, and wherein said ring member is engaged with said torque transfer feature.

9. The linear actuator system of claim 1 wherein said end portion of said screw member comprises splines, and wherein said ring member is in meshed engagement with said splines.

10. The linear actuator system of claim 1 wherein said ring member is clamped onto said end portion of said screw member.

11. The linear actuator system of claim 1 wherein said ring member comprises a circumferentially extending body portion, wherein said circumferentially extending body portion defines a gap, and wherein a threaded fastener bridges said gap.

12. The linear actuator system of claim 1 wherein said threaded member is a bolt or screw.

13. The linear actuator system of claim 1 wherein said distal end of said threaded member protrudes into abutting engagement with said ring member.

14. The linear actuator system of claim 1 wherein said nut member comprises a first tooth member and said ring member comprises a second tooth member, and wherein said first tooth member circumferentially engages said second tooth member when said nut member axially approximates said ring member.

15. The linear actuator system of claim 14 wherein said nut member comprises a body having a first end longitudinally opposed from a second end, and wherein said first tooth member is connected to said first end.

16. The linear actuator system of claim 15 wherein said ring member comprises an inside end longitudinally opposed from an outside end, and wherein said second tooth member is connected to said inside end.

17. The linear actuator system of claim 14 wherein each of said first tooth member and said second tooth member comprises a circumferentially extending ramped portion terminating at a face portion.

18. The linear actuator system of claim 17 wherein said face portion of said first tooth member engages said face portion of said second tooth member when said nut member comes into abutting engagement with said ring member.

19. A method for end stopping the linear actuator system of claim 1, said method comprising steps of:
positioning said ring member over said end portion of said screw member, such that said screw member extends through a bore of said ring member;
connecting said flange member to said end portion of said screw member; and
threading said threaded member through said flange member until said distal end of said threaded member comes into abutting engagement with said ring member.

20. A linear actuator system comprising:
a screw member elongated along a longitudinal axis and comprising an end portion, wherein said end portion comprises a plurality of splines and defines a threaded bore;
a nut member coaxially received over said screw member, such that said screw member extends through a bore of said nut member, said nut member comprising a first tooth member;
a ring member in meshed engagement with said plurality of splines, said ring member comprising a second tooth member;
a flange member comprising a flange portion and a threaded shaft extending from said flange portion, wherein said threaded shaft is in threaded engagement with said threaded bore; and
a plurality of threaded members in threaded engagement with said flange portion of said flange member, each threaded member of said plurality of threaded members comprising a distal end protruding into abutting engagement with said ring member.

* * * * *